(12) United States Patent
Poteet et al.

(10) Patent No.: US 11,603,474 B2
(45) Date of Patent: Mar. 14, 2023

(54) CORROSION INHIBITION SYSTEM

(71) Applicant: GOODRICH CORPORATION, Charlotte, NC (US)

(72) Inventors: Steven A. Poteet, Hamden, CT (US); Blair A. Smith, South Windsor, CT (US); Vijay V. Pujar, San Diego, CA (US); Leslie Steele, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 412 days.

(21) Appl. No.: 16/660,436

(22) Filed: Oct. 22, 2019

(65) Prior Publication Data
US 2021/0115267 A1  Apr. 22, 2021

(51) Int. Cl.
*C09D 5/08* (2006.01)
*C09D 7/40* (2018.01)
*C09D 7/62* (2018.01)
*C09D 5/00* (2006.01)
*C09D 163/00* (2006.01)
*C09D 167/08* (2006.01)

(52) U.S. Cl.
CPC ............. *C09D 5/086* (2013.01); *C09D 5/002* (2013.01); *C09D 5/084* (2013.01); *C09D 7/62* (2018.01); *C09D 7/70* (2018.01); *C09D 163/00* (2013.01); *C09D 167/08* (2013.01)

(58) Field of Classification Search
CPC ...... C25D 11/04–30; C09D 5/082–086; C09D 163/00–10
See application file for complete search history.

(56) References Cited

U.S. PATENT DOCUMENTS 4,897,129 A * 1/1990 Tuttle, Jr. ............... C23C 22/83
148/256
7,527,872 B2  5/2009 Steele et al.
(Continued)

FOREIGN PATENT DOCUMENTS

| CN | 105951151 | 9/2016 |
| EP | 3378903 | 9/2018 |
| WO | 2019155207 | 8/2019 |

OTHER PUBLICATIONS

European Patent Office, European Search Report dated Jul. 21, 2020 in Application No. 19215789.9.

*Primary Examiner* — Kregg T Brooks
(74) *Attorney, Agent, or Firm* — Snell & Wilmer L.L.P.

(57) ABSTRACT

A method of corrosion inhibition on a substrate may comprise: applying a sealing solution to an anodized surface of the substrate, wherein the sealing solution may comprise a nanomaterial dopant and a corrosion inhibiting compound, wherein the nanomaterial dopant may comprise at least one of graphene nanoplatelets, carbon nanotubes, and carbon nanofibers, and wherein the corrosion inhibiting compound may comprise at least one of a trivalent chromium compound, a trivalent praseodymium compound, nickel acetate, cobalt acetate, siloxanes, silicates, orthophosphates, molybdates, or a compound comprising at least one of elemental or ionic praseodymium, cerium, cesium, lanthanum, zinc, lithium, magnesium, or yttrium; and drying the sealing solution on the substrate to form a sealing layer comprising the nanomaterial dopant and the corrosion inhibiting compound.

15 Claims, 2 Drawing Sheets

(56) References Cited

U.S. PATENT DOCUMENTS

| | | | |
|---|---|---|---|
| 7,601,425 B2* | 10/2009 | Stotter | C09C 1/56 |
| | | | 428/413 |
| 9,771,481 B2 | 9/2017 | Lawless et al. | |
| 10,011,723 B2 | 7/2018 | Papakonstantinou | |
| 2010/0203340 A1 | 8/2010 | Ruoff et al. | |
| 2014/0227511 A1 | 8/2014 | Mazany | |
| 2015/0191604 A1* | 7/2015 | Lawless | C25D 11/24 |
| | | | 252/502 |
| 2016/0024310 A1 | 1/2016 | McMullin et al. | |
| 2016/0312038 A1 | 10/2016 | Bohm et al. | |
| 2018/0274103 A1 | 9/2018 | Poteet | |
| 2019/0169443 A1 | 6/2019 | Poteet | |
| 2019/0338146 A1* | 11/2019 | Meng | C08G 18/6225 |

* cited by examiner

CORROSION INHIBITION SYSTEM

FIELD

The present disclosure relates generally to corrosion inhibition systems for substrates.

BACKGROUND

Metal substrates may be susceptible to corrosion in certain environments, such as the environments in which the tools or machines comprising the metal substrates are used. However, conventionally-used hexavalent chromium is toxic, and therefore, corrosion inhibition systems on substrates without hexavalent chromium, that provide comparable corrosion inhibition to systems including hexavalent chromium, are desired.

SUMMARY

In various embodiments, a method of corrosion inhibition on a substrate may comprise: applying a sealing solution to an anodized surface of the substrate, wherein the sealing solution may comprise a nanomaterial dopant and a corrosion inhibiting compound, wherein the nanomaterial dopant may comprise at least one of graphene nanoplatelets, carbon nanotubes, and carbon nanofibers, and wherein the corrosion inhibiting compound may comprise at least one of a trivalent chromium compound, a trivalent praseodymium compound, nickel acetate, cobalt acetate, siloxanes, silicates, orthophosphates, molybdates, or a compound comprising at least one of elemental or ionic praseodymium, cerium, cesium, lanthanum, zinc, lithium, magnesium, or yttrium; and drying the sealing solution on the substrate to form a sealing layer comprising the nanomaterial dopant and the corrosion inhibiting compound.

In various embodiments, the nanomaterial dopant may comprise oxygen on a nanomaterial surface of the nanomaterial dopant, and the nanomaterial dopant may be functionalized with at least one of an organosilane, an oxysilane, an amine, an epoxide, a mercapto group, a phosphate ester, a titanate, an aliphatic species, an aromatic species, or a compound that may form via esterification. In various embodiments, the nanomaterial dopant may be functionalized by adding at least one of the organosilane or the oxysilane to the sealing solution comprising the nanomaterial dopant such that the at least one of the organosilane or the oxysilane bond may with the nanomaterial dopant.

In various embodiments, the method may further comprise applying a primer to the substrate after the drying the sealing solution, wherein the primer may comprise at least one of an epoxy, an alkyd, or polyurethane. In various embodiments, the primer may comprise a primer corrosion inhibiting compound comprising at least one of a trivalent chromium compound, a trivalent praseodymium compound, siloxanes, silicates, orthophosphates, molybdates, or a compound comprising at least one of elemental or ionic praseodymium, cerium, cesium, lanthanum, zinc, lithium, magnesium, or yttrium. In various embodiments, the method may further comprise strengthening adhesion of the sealing layer to at least one of the substrate or the primer via the functionalization of the nanomaterial dopant. In various embodiments, adding the at least one of the organosilane or the oxysilane to the sealing solution may comprise adding a first organosilane or oxysilane and a second organosilane or oxysilane, wherein the first organosilane or oxysilane may functionalize the nanomaterial dopant to strengthen adherence of the sealing layer to the substrate, and wherein the second organosilane or oxysilane may functionalize the nanomaterial dopant to strengthen adherence of the sealing layer to the primer.

In various embodiments, the corrosion inhibiting compound may comprise at least one of chromium (III) oxide, praseodymium(III) oxide, cerium oxide, yttrium oxide, lanthanum oxide, magnesium silicate, aluminum phosphate, lithium carbonate, silicic acid, trizinc bis(orthophosphate), and molybdenum oxide.

In various embodiments, the method may further comprise anodizing the substrate to create the anodized surface of the substrate by applying an acid solution to the substrate comprising at least one of sulfuric acid, chromic acid, boric acid-sulfuric acid, tartaric acid-sulfuric acid, phosphoric acid, oxalic acid before the applying the sealing solution.

In various embodiments, the substrate may comprise aluminum, aluminum alloy, titanium, a titanium alloy, magnesium, and/or a magnesium alloy. In various embodiments, the sealing solution may comprise about 10% by weight nanomaterial dopant. In various embodiments, the sealing layer may comprise between 0.025% to 3.5% by weight nanomaterial dopant. In various embodiments, the sealing solution may comprise nickel acetate and/or cobalt acetate.

In various embodiments, a corrosion inhibition system disposed on a substrate, may comprise: a sealing layer disposed on an anodized surface of the substrate, wherein the sealing layer may comprise a nanomaterial dopant and a corrosion inhibiting compound, wherein the nanomaterial dopant may comprise at least one of graphene nanoplatelets, carbon nanotubes, or carbon nanofibers, and wherein the corrosion inhibiting compound may comprise at least one of a trivalent chromium compound, a trivalent praseodymium compound, nickel acetate, cobalt acetate, siloxanes, silicates, orthophosphates, molybdates, or a compound comprising at least one of elemental or ionic praseodymium, cerium, cesium, lanthanum, zinc, lithium, magnesium, or yttrium. In various embodiments, the nanomaterial dopant may comprise oxygen on a nanomaterial surface, wherein the nanomaterial dopant may be functionalized with at least one of an organosilane or an oxysilane. In various embodiments, the corrosion inhibition system may further comprise a primer layer disposed on the sealing layer, wherein the primer layer may comprise at least one of an epoxy, an alkyd, or polyurethane. In various embodiments, the sealing layer may be better adhered to at least one of the substrate or the primer via the nanomaterial dopant being functionalized.

In various embodiments, the sealing layer may comprise between 0.025% to 3.5% by weight nanomaterial dopant.

In various embodiments, a sealing solution for use in a corrosion inhibition system on a substrate may comprise: at least one of a trivalent chromium compound or a trivalent praseodymium compound; and a nanomaterial dopant comprising graphene nanoplatelets, wherein, the sealing solution may comprise an amount of the nanomaterial dopant such that a sealing layer resulting from drying the sealing solution may comprise between 0.025 and 3.5% by weight the nanomaterial dopant. In various embodiments, the graphene nanoplatelets may be functionalized with at least one of an organosilane or an oxysilane.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Value ranges include their minimum and maximum limits. Also, any reference to attached, fixed, connected, or the like may include permanent, removable, temporary, partial, full and/or any other possible attachment option. Also, it should be understood that while various embodiments discussed herein may make reference to a specific nanomaterial dopant (e.g., graphene nanoplatelets), such references are for purposes of illustration only, and the same or similar benefits and/or effects may be achieved by the use of other nanomaterial dopants replacing or in combination with the specific nanomaterial dopant used in the respective example or embodiment.

Corrosion inhibition systems used on metal and metal coated substrates are used in many industries. For example, metal substrates or components in aircraft or other vehicles, such as automobiles, trains, and heavy equipment, may be coated with a corrosion inhibition system. In addition, metal substrates are found in construction contexts, such as used on building infrastructures.

As used herein, a "substrate" may include any metal and/or metal-coated material. For example, a substrate may comprise iron, coated iron, steel, coated steel, stainless steel, coated stainless steel, nickel and/or nickel alloys, coated nickel/nickel alloy, aluminum or aluminum alloy, coated aluminum/aluminum alloy, magnesium and/or magnesium alloy, titanium and/or titanium alloy, coated titanium/titanium alloy, bronze, coated bronze, copper beryllium, coated copper beryllium, zinc and/or zinc alloys, and/or coated zinc or zinc-nickel alloys. A layer of a corrosion inhibition system may be applied by any suitable method, such as spraying or painting a solution that will form a layer of the corrosion inhibition system on the substrate, submerging the substrate in a solution that will form a layer of the corrosion inhibition system on the substrate, or the like. In various embodiments, a substrate may comprise aluminum and/or an aluminum alloy, and/or magnesium and/or a magnesium alloy.

Figure 1:
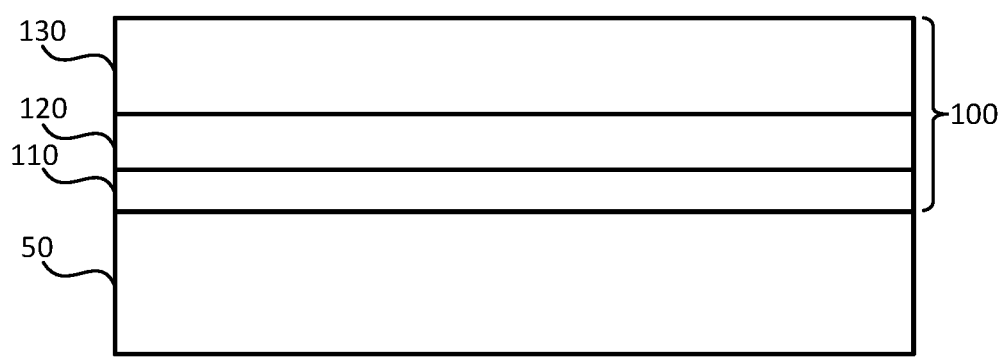
FIG. 1 illustrates schematic drawings of a substrate with a corrosion inhibition system disposed thereon, in accordance with various embodiments.

With reference to FIG. 1, in various embodiments, a substrate 50 may comprise a corrosion inhibition system 100. Substrate 50 may be any of the substances described herein, such as aluminum metal or an aluminum alloy, including aluminum alloys in the 2000 series, 6000 series and 7000 series, cold-rolled or stainless steels, or zinc-nickel alloys.

Figure 2:
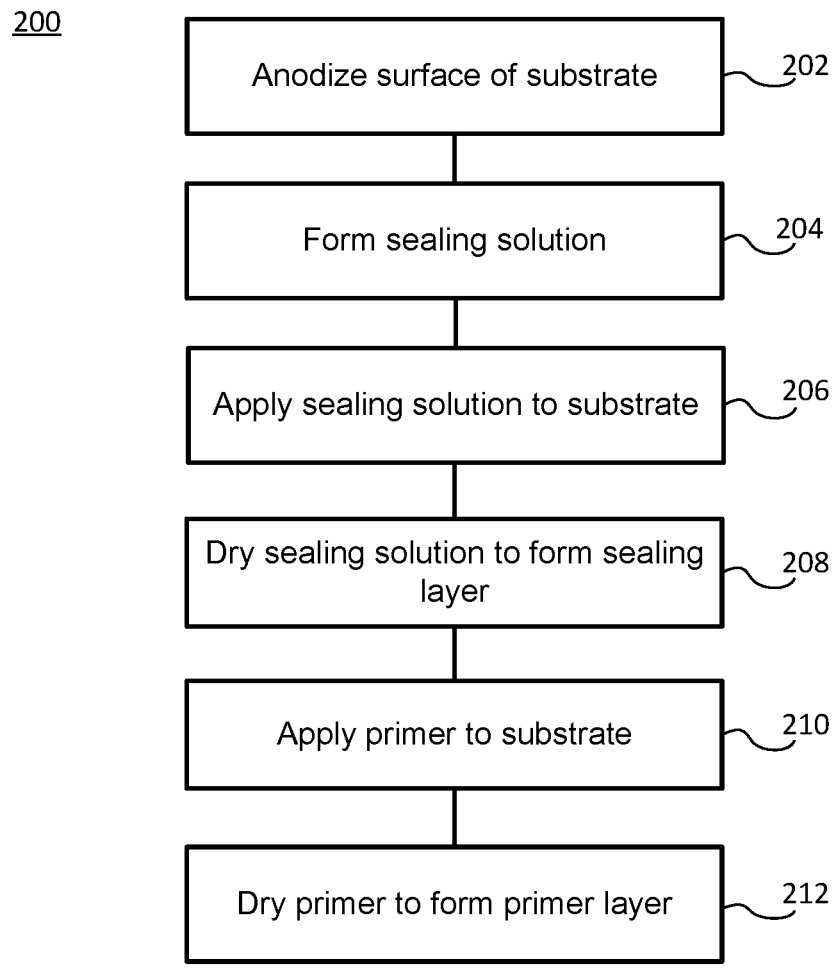
FIG. 2 illustrates a method for disposing a corrosion inhibition system on a substrate, in accordance with various embodiments.

In various embodiments, corrosion inhibition system 100 may comprise an anodized layer 110, a sealing layer 120, and/or a primer layer 130. With additional reference to FIG. 2, and method 200 for disposing a corrosion inhibition system on a substrate, an outer surface of substrate 50 may be anodized (step 202) to form anodized layer 110. Anodizing of substrate 50 may be performed by any suitable method. For example, an anodizing solution comprising sulfuric acid, chromic acid, phosphoric acid, boric acid-sulfuric acid, tartaric acid-sulfuric acid, oxalic acid, and/or any other suitable substance may be applied to substrate 50 (e.g., substrate 50 may be submerged in a bath of such an anodizing solution). As another example, an anodizing solution comprising ammonium acid fluoride, sodium dichromate and phosphoric acid, and/or any other suitable substance may be applied to substrate 50. As yet another example, an anodizing solution comprising potassium hydroxide, potassium fluoride, aluminum hydroxide, trisodium phosphate, potassium permanganate, and/or any other suitable substance may be applied to substrate 50. Anodized layer 110 may be formed on substrate 50 as a result of the interaction between substrate 50 and the anodizing solution. Application of the anodizing solution to substrate 50 may be for any suitable duration (e.g., between 5 and 20 minutes, or between 5 and 120 minutes).

In various embodiments, anodized layer 110 may be comprised in substrate 50. Anodized layer 110 may be porous. A pore of the plurality of pores in anodized layer 110 may have a cross section taken on a plane parallel to the outer surface of substrate 50 that is between about 12 to about 15 nanometers (0.00000047 to 0.00000059 inch) across (wherein "about" as used in this context means plus or minus 4 nanometers).

In various embodiments, continuing with method 200, a sealing solution may be formed (step 204). The sealing solution may comprise a nanomaterial dopant and/or a corrosion inhibiting compound. In various embodiments, the nanomaterial dopant may comprise graphene nanoplatelets, carbon nanotubes, and/or carbon nanofibers. The nanomaterial dopant may be added to the solution comprising the corrosion inhibiting compound. The corrosion inhibiting compound may comprise a trivalent chromium compound (e.g., chromium(III) oxide), a trivalent praseodymium compound (e.g., praseodymium(III) oxide), nickel acetate, cobalt acetate, siloxanes, silicates, silicic acid, phosphates (e.g., aluminum phosphate), orthophosphates, molybdates, and/or a compound comprising at least one of elemental or ionic praseodymium (e.g., praseodymium(III) oxide), cerium (e.g., cerium oxide), cesium (e.g., cesium oxide), lanthanum (e.g., lanthanum oxide), zinc (e.g., trizinc bis (orthophosphate)), lithium (e.g., lithium carbonate), molybdenum (e.g., molybdenum oxide), magnesium (e.g., magnesium silicate), or yttrium (e.g., yttrium oxide). In various embodiments, the corrosion inhibiting compound may comprise a hexavalent chromium compound. The sealing solution may comprise about 10% by weight nanomaterial dopant (e.g., graphene nanoplatelets) (wherein "about" as used in this context means plus or minus 2 wt %). In various embodiments, the sealing solution may comprise chromium sulfate ($Cr_2(SO_4)_3$). In various embodiments, the sealing solution may comprise chromium sulfate and/or sodium fluorosilicate ($Na_2SiF_6$) in a solvent or carrier fluid (e.g., water). In various embodiments, the sealing solution may comprise polytetrafluoroethene (PTFE).

In various embodiments, the nanomaterial dopant may be functionalized to enhance (e.g., strengthen) interactions and/or bonding between the layers of corrosion inhibition system 100 and/or compounds within the sealing solution and/or sealing layer 120. For example, in embodiments in which the nanomaterial dopant comprises graphene nanoplatelets (or other suitable nanomaterial dopant), the graphene nanoplatelets (or other suitable nanomaterial dopant) may be functionalized by functionalizing compounds such as organosilanes and/or oxysilanes. In various embodiments, a functionalizing compound used to functionalize the nanomaterial dopant may comprise amines, epoxides, mercapto groups, phosphate esters, titanates, aliphatic species, aromatic species, and/or (other) compounds that may form via esterification. Organosilanes and/or oxysilanes may be added to the nanomaterial dopant solution to functionalize the nanomaterial dopant. Without being bound by theory, one or more components of the nanomaterial dopant solution may hydrolyze off a portion of an organosilane or oxysilane (or other functionalizing compound), which may allow that location on the organosilane or oxysilane (or other functionalizing compound) to bond or react with the nanomaterial dopant. Or, the organosilane or oxysilane (or other functionalizing compound) may interact with or react with nanomaterial dopant (e.g., in the case of graphene nanoplatelets, interact or react with the oxides on the surface of the graphene nanoplatelets) to bond the organosilane or oxysilane (or other functionalizing compound) to the nanomaterial dopant.

In various embodiments, the sealing solution may comprise multiple functionalizing compounds, which may functionalize the nanomaterial dopant(s) differently, such that there are different nanomaterial dopants in the sealing solution (caused by the different functionalization). For example, a first functionalizing compound (e.g., a first organosilane, oxysilane, or any other suitable compound) may be added to the sealing solution and/or nanomaterial dopant solution, which may functionalize the nanomaterial dopant in a first manner to better adhere the resulting sealing layer 120 to substrate 50 via the first functionalized nanomaterial dopant. A second functionalizing compound (e.g., a second organosilane, oxysilane, or any other suitable compound) may be added to the sealing solution and/or nanomaterial dopant solution (simultaneously, at a different time, and/or to a separate solution that will be combined with the solution comprising the first functionalizing compound), which may functionalize the nanomaterial dopant in a second manner to better adhere the resulting sealing layer 120 to primer 130 via the second functionalized nanomaterial dopant.

In various embodiments, the graphene nanoplatelets may comprise a surface comprising 15% oxygen (e.g. oxides such as ketones, hydroxyl groups, carboxyl groups, and/or the like), allowing the organosilanes and/or oxysilanes (or other functionalizing compound) to interact, react, and bond with the graphene nanoplatelets and the surface oxygen thereon. For example, a triethoxysilane may be used to functionalize the graphene nanoplatelets. One of the ethoxy groups may be hydrolyzed off of the triethoxysilane, and that location on the molecule may bond with oxygen on the graphene nanoplatelets. The other components of the molecule (organosilane, oxysilane, and/or other functionalizing compound) used to functionalize the graphene nanoplatelets may be selected to better bond sealing layer 120 to primer layer 130. For example, on the triethoxysilane discussed above, the fourth component bonded to the silicon atom may be amine-terminated. In various embodiments, the functionalized graphene nanoplatelets may bond to hydroxyl groups on substrate 50, for example, in anodized layer 110 (e.g., alumina hydroxy for a substrate 50 comprising aluminum).

The sealing solution may be applied to substrate 50 (step 206). For example, the sealing solution may be applied directly to anodized layer 110. The sealing solution may be applied to substrate 50 in any suitable manner, such as painting, brushing, or spraying the sealing solution onto substrate 50, and/or submerging substrate 50 in the sealing solution. For example, submerging substrate 50 in the sealing solution may be performed at any suitable temperature (e.g., from about 20° C. to about 100° C.) for any suitable duration (e.g., from about 1 minute to 60 minutes). In response, the sealing solution may be dried to form sealing layer 120 (step 208). In various embodiments, the formation of sealing layer 120 may be performed by a trivalent chromium process.

In various embodiments, sealing layer 120 may comprise between 0.025 and 3.5% weight nanomaterial dopant, between 0.05 and 2% by weight nanomaterial dopant, between 0.05 and 1.5% by weight nanomaterial dopant, or any other suitable compositional makeup. In various embodiments, sealing layer 120 may be between 30 millionths of an inch (76 nanometers) and 0.001 inch (25.4 micrometers).

In various embodiments, the graphene nanoplatelets (or other suitable nanomaterial dopant) in the sealing solution and sealing layer 120 may be about 1 micrometer (0.000039 inch) (wherein "about" in this context means plus or minus 0.5 micrometer), or between 0.05 micrometer (0.000019 inch) and 5 micrometers (0.00002 inch), or between 0.05 micrometer (0.000019 inch) and 25 micrometers (0.001 inch) across. Therefore, because the graphene nanoplatelets may have a larger cross-sectional area than the pores in anodized layer 110, the graphene nanoplatelets of the sealing solution may remain at the top of sealing layer 120 (i.e., outside the pores of anodized layer 110, the top of sealing layer 120 being the portion of sealing layer 120 furthest from substrate 50), while the other components of the sealing solution infiltrate the pores of anodized layer 110. Without being bound by theory, it is thought that the graphene nanoplatelets may form protective sheets to mitigate and prevent corrosion on substrate 50. That is, the graphene nanoplatelets may form a layer at the top of sealing layer 120 (the edge of sealing layer 120 furthest from substrate 50), which may comprise multiple sheets of graphene nanoplatelets, providing a barrier to prevent corrosion on substrate 50, for example, by blocking a galvanic relationship between substrate 50 (e.g., which may comprise aluminum) and any other substances with which substrate 50 and corrosion inhibition system 100 may come in contact or interact. Such interaction between the graphene nanoplatelets may be facilitated by the functional groups on the graphene nanoplatelets from the functionalization. In various embodiments PTFE may impregnate the pores of anodized layer 110, such that the PTFE seals anodized layer 110. In various embodiments, anodized layer 110 and sealing layer 120 may be overlapping.

If graphene nanoplatelets penetrate the pores of anodized layer 110, the graphene nanoplatelets in contact or close proximity with substrate 50 may create a risk of forming a galvanic cell between the graphene nanoplatelets and substrate 50. Therefore, the graphene nanoplatelets creating a layer at the top of sealing layer 120 may be advantageous.

In various embodiments, to further prevent graphene nanoplatelets from infiltrating the pores of anodized layer 110, and thus, mitigating the risk of a galvanic cell being formed between the graphene nanoplatelets and substrate 50, nickel acetate and/or cobalt acetate may be comprised in the sealing solution. Nickel acetate and/or cobalt acetate may form precipitates, which may fill and/or block the pores in anodized layer 110, blocking graphene nanoplatelets from infiltrating the pores in anodized layer 11. Therefore, the risks associated with graphene nanoplatelets infiltrating the pores in anodized layer 110 may be mitigated and/or prevented.

Additionally, without being bound by theory, the graphene nanoplatelets (or other nanomaterial dopant) may have a synergistic relationship (e.g., interact and/or react) with the trivalent chromium compound and/or trivalent praseodymium compound in the sealing solution and/or sealing layer 120, which may form a uniform $Cr_2O_3$ and/or $Pr_2O_3$ layer. Additionally, the functionalized graphene nanoplatelets may oxidize the trivalent chromium and/or trivalent praseodymium from the sealing solution and/or sealing layer 120 into hexavalent chromium in situ in sealing layer 120. This self-healing chromium oxide and/or praseodymium oxide film on the surface of substrate 50 continues to prevent corrosion and prevents degradation over time of sealing layer 120 (e.g., by controlling the release of ions to damaged areas of the corrosion inhibition system 100 and/or redirecting electron pathways).

Moreover, the functionalized graphene nanoplatelets may provide electrical conductivity, which may affect the potentials needed to induce corrosion. These properties create additional corrosion resistance for substrate 50, and particularly guard against scribe damage. Specifically, functionalized graphene nanoplatelets can sequester corrosion inhibitors near a site of substrate exposure to the environment, slowing corrosion at that site.

In various embodiments, anodized layer 110 and sealing layer 120 may be formed simultaneously. Therefore, steps 202-206 may be combined into one step of applying a slurry comprising, for example, sealing solution components. In such embodiments, anodized layer 110 and sealing layer 120 may be one layer, and/or anodized layer 110 and sealing layer 120 may be overlapping layers within corrosion inhibition system 100.

In various embodiments, a conversion coating may be applied to substrate 50, and may react on and/or with a surface of substrate 50. In such embodiments, as a result, a self-healing film may be formed on substrate 50 in place of, or in addition to, anodized layer 110 and/or sealing layer 120.

In various embodiments, a primer may be applied to substrate 50 (step 210). For example, the primer may be applied directly to sealing layer 120. The primer may be applied to substrate 50 in any suitable manner, such as painting, brushing, or spraying the primer onto substrate 50, and/or submerging substrate 50 in the primer. In response, the primer may be dried to form primer layer 130 (step 212).

In various embodiments, the primer may comprise an epoxy, an alkyd, and/or polyurethane, which may comprise one or more non-chromate corrosion inhibitors. The non-chromate corrosion inhibitor can be praseodymium, manganese, silane, aluminum, zinc, or a rare earth metal depending on the desired anti-corrosion properties. In various embodiments, the primer may comprise a primer corrosion inhibiting compound, which may comprise any suitable material, including those discussed in reference to the corrosion inhibiting compound comprised in the sealing solution (e.g., a trivalent chromium compound, a trivalent praseodymium compound, siloxanes, silicates, orthophosphates, molybdates, and/or a compound comprising at least one of elemental or ionic praseodymium, cerium, cesium, lanthanum, zinc, lithium, magnesium, and/or yttrium). The primer may comprise a base component, a catalyst component, and a thinner component. For example, this mixture may comprise a solvent, pre-polymers that will make a BPA (bisphenol-A-(epichlorhydrin)), bisphenol-A-(epichlorhydrin), gypsum, butan-2-ol, titanium dioxide, dipraseodymium trioxide, crystalline silica, rheological modifiers, epoxy resin, and/or pigments, such as those found in Deft® 44GN098 or Hentzen 16708TEP/16709CEH.

In various embodiments, the primer applied to substrate 50 may be dried (step 212) to form primer layer 130. Primer layer 130 may be disposed directly on sealing layer 120 and/or the layer comprising the sealing layer 120 and anodized layer 110 components.

The steps of method 200 may be performed at any suitable temperature (e.g., ambient temperature, an elevated temperature, a variable temperature, and/or the like).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of

What is claimed is:

1. A method of corrosion inhibition on a substrate, comprising:
applying a sealing solution to an anodized surface of the substrate, wherein the substrate comprises at least one of aluminum, an aluminum alloy, a titanium alloy, magnesium, or a magnesium alloy, wherein the anodized surface comprises a plurality of pores, wherein each pore of the plurality of pores comprises a pore cross-sectional area, wherein the sealing solution comprises a nanomaterial dopant and a corrosion inhibiting compound,
wherein the nanomaterial dopant comprises at least one of graphene nanoplatelets, carbon nanotubes, and carbon nanofibers, wherein the nanomaterial dopant comprises a cross-sectional area that is greater than the pore cross-sectional area such that the nanomaterial dopant remains outside the plurality of pores, and
wherein the corrosion inhibiting compound comprises at least one of a trivalent chromium compound, a trivalent praseodymium compound, nickel acetate, cobalt acetate, siloxanes, silicates, orthophosphates, molybdates, or a compound comprising at least one of elemental or ionic praseodymium, cerium, cesium, lanthanum, zinc, lithium, magnesium, or yttrium;
drying the sealing solution on the substrate to form a sealing layer comprising the nanomaterial dopant and the corrosion inhibiting compound; and
applying a primer to the substrate after the drying the sealing solution, wherein the primer comprises an epoxy.

2. The method of claim 1, wherein the nanomaterial dopant comprises oxygen on a nanomaterial surface of the nanomaterial dopant, and wherein the nanomaterial dopant is functionalized with at least one of an organosilane, an oxysilane, an amine, an epoxide, a mercapto group, a phosphate ester, a titanate, an aliphatic species, an aromatic species, or a compound that may form via esterification.

3. The method of claim 2, wherein the nanomaterial dopant is functionalized by adding the at least one of the organosilane or the oxysilane to the sealing solution comprising the nanomaterial dopant such that the at least one of the organosilane or the oxysilane bond with the nanomaterial dopant.

4. The method of claim 3, further comprising strengthening adhesion of the sealing layer to at least one of the substrate or the primer via the functionalization of the nanomaterial dopant.

5. The method of claim 4, wherein the adding the at least one of the organosilane or the oxysilane to the sealing solution comprises adding a first organosilane or oxysilane and a second organosilane or oxysilane, wherein the first organosilane or oxysilane functionalizes the nanomaterial dopant to strengthen adherence of the sealing layer to the substrate, and wherein the second organosilane or oxysilane functionalizes the nanomaterial dopant to strengthen adherence of the sealing layer to the primer.

6. The method of claim 1, wherein the primer comprises a primer corrosion inhibiting compound comprising at least one of a trivalent chromium compound, a trivalent praseodymium compound, siloxanes, silicates, orthophosphates, molybdates, or a compound comprising at least one of elemental or ionic praseodymium, cerium, cesium, lanthanum, zinc, lithium, magnesium, or yttrium.

7. The method of claim 1, wherein the corrosion inhibiting compound comprises at least one of chromium (III) oxide, praseodymium(III) oxide, cerium oxide, yttrium oxide, lanthanum oxide, magnesium silicate, aluminum phosphate, lithium carbonate, silicic acid, trizinc bis(orthophosphate), and molybdenum oxide.

8. The method of claim 1, further comprising anodizing the substrate to create the anodized surface of the substrate by applying an acid solution to the substrate comprising at least one of sulfuric acid, chromic acid, boric acid-sulfuric acid, tartaric acid-sulfuric acid, phosphoric acid, oxalic acid before the applying the sealing solution.

9. The method of claim 1, wherein the sealing solution comprises about 10% by weight nanomaterial dopant.

10. The method of claim 1, wherein the sealing layer comprises between 0.025% to 3.5% by weight nanomaterial dopant.

11. A corrosion inhibition system disposed on a substrate, comprising:
a sealing layer disposed on an anodized surface of the substrate, wherein the substrate comprises at least one of aluminum, an aluminum alloy, a titanium alloy, magnesium, or a magnesium alloy, wherein the anodized surface comprises a plurality of pores, wherein each pore of the plurality of pores comprises a pore cross-sectional area, wherein the sealing layer comprises a nanomaterial dopant and a corrosion inhibiting compound, wherein the nanomaterial dopant comprises at least one of graphene nanoplatelets, carbon nanotubes, or carbon nanofibers, wherein the nanomaterial dopant comprises a cross-sectional area that is greater than the pore cross-sectional area such that the nanomaterial dopant remains outside the plurality of pores, and wherein the corrosion inhibiting compound comprises at least one of a trivalent chromium compound, a trivalent praseodymium compound, nickel acetate, cobalt acetate, siloxanes, silicates, orthophosphates, molybdates, or a compound comprising at least one of elemental or ionic praseodymium, cerium, cesium, lanthanum, zinc, lithium, magnesium, or yttrium; and
a primer layer disposed on the sealing layer, wherein the primer layer comprises an epoxy.

12. The corrosion inhibition system of claim 11, wherein the nanomaterial dopant comprises oxygen on a nanomaterial surface, wherein the nanomaterial dopant is functionalized with at least one of an organosilane or an oxysilane.

13. The corrosion inhibition system of claim 12, wherein the sealing layer is adhered to at least one of the substrate or the primer at least partially via the nanomaterial dopant being functionalized.

14. The corrosion inhibition system of claim 13, wherein the sealing layer comprises between 0.025% to 3.5% by weight nanomaterial dopant.

15. The corrosion inhibition system of claim 13, wherein the sealing layer comprises at least one of nickel acetate or cobalt acetate.

* * * * *